United States Patent
Iwabuchi et al.

(10) Patent No.: US 6,361,714 B1
(45) Date of Patent: Mar. 26, 2002

(54) METHOD OF PREPARING BARIUM FLUOROHALIDE PHOSPHOR

(75) Inventors: Yasuo Iwabuchi; Chiyuki Umemoto; Kenji Takahashi; Kazuhiro Hasegawa, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/586,595

(22) Filed: Jun. 2, 2000

(30) Foreign Application Priority Data

Jun. 3, 1999 (JP) ............................................. 11-156746
Jun. 3, 1999 (JP) ............................................. 11-156747

(51) Int. Cl.$^7$ ............................................... C09K 11/00
(52) U.S. Cl. ............................................... 252/301.4 H
(58) Field of Search .................................. 252/301.4 H

(56) References Cited

U.S. PATENT DOCUMENTS

| | | | |
|---|---|---|---|
| 4,400,619 A | 8/1983 | Kotera et al. ............. | 250/327.2 |
| 6,168,730 B1 * | 1/2001 | Nabeta et al. ........ | 252/301.4 H |
| 6,290,873 B1 * | 9/2001 | Takahashi et al. ... | 252/301.4 H |

FOREIGN PATENT DOCUMENTS

| | | |
|---|---|---|
| EP | A20712917 | 5/1996 |
| JP | 6-9956 * | 1/1994 |
| JP | A07233369 | 9/1995 |
| JP | A10195431 | 7/1998 |

* cited by examiner

Primary Examiner—C. Melissa Koslow
(74) Attorney, Agent, or Firm—Birch, Stewart, Kolasch & Birch, LLP

(57) ABSTRACT

A method of preparing a barium fluorohalide phosphor including a mixing step in which phosphor materials are mixed, a firing step in which a resulting mixture of phosphor materials is fired, an annealing step, and a cooling step in which the mixture of phosphor materials is cooled to the ordinary temperature. In the firing step, after the mixture of phosphor materials has been fired at a constant temperature, an atmosphere at the time of the firing is removed while the constant temperature is maintained, and is replaced with an atmosphere different from the atmosphere at the time of the firing, and thereafter, annealing is carried out. In the cooling step, the atmosphere at the time of the firing is removed and replaced with a first different atmosphere, and then first cooling is carried out. Further, the first atmosphere is removed and replaced with a second atmosphere, and then second cooling is carried out. Alternatively, in the cooling step, the atmosphere at the time of the firing is removed and replaced with vacuum or a neutral gas atmosphere, and then cooling is carried out.

23 Claims, No Drawings

METHOD OF PREPARING BARIUM FLUOROHALIDE PHOSPHOR

BACKGROUND OF THE INVENTION

1. Field of the Invention

The present invention relates to a method of preparing a stimulable phosphor which retains part of energy of irradiated radiation for a certain period of time and emits light by a specific electromagnetic wave. Specifically, the present invention relates to a method of preparing a barium fluorohalide based stimulable phosphor which exhibits good light emission performance and good erasability.

2. Description of the Related Art

Conventionally, there has been known a bivalent europium-activated barium fluorohalide phosphor (BaFX: $Eu^{2+}$; wherein X is a halogen atom other than fluorine) which emits light (instantaneous emission of light) in ranges from a near-ultraviolet region to a blue light region by exicitation with radiation such as an X-ray, gamma-ray, electron beam, or ultraviolet beam. The phosphor is used as a phosphor for radiosensitization screens employed in radiography or the like.

Further, it has been recently found that, when the above-described phosphor is exposed to radiation such as an X-ray, gamma-ray, electron beam, or ultraviolet beam, and thereafter, excited with electromagnetic wave (excitation light) in wavelength ranges from a visible region to an infrared region, the phosphor emits light (stimulated emission) in ranges from a near-ultraviolet region to a blue light region. The above-described phosphor has been noted especially as a phosphor useful for a radiation image conversion technique, which is used in place of conventional radiography.

This radiation image conversion technique utilizes a radiation image conversion panel (an accummulative fluorescent sheet) in which a phosphor layer containing a stimulable (accelerated phosphorescent) phosphor is provided on a support. Radiation transmitted through an object or emitted from an object to be examined is absorbed by the stimulable phosphor on the panel. Thereafter, the stimulable phosphor is excited in accordance with a time series by an electromagnetic wave (excitation light) whose wavelength is in a range from a visible region to an infrared region. The radiation energy stored in the stimulable phosphor is thereby made to emerge as fluorescence (stimulated emission), and an electrical signal is obtained by photoelectrically reading the fluorescence. Finally, an image is produced based on the obtained electrical signal.

By using this radiation image conversion panel, an image can be produced at an accessible emission amount which is lower than that in conventional radiography. Moreover, an image obtained by using this panel can be processed by a computer. Therefore, a radiation image which contains much information can be obtained, and defective images can be corrected.

Among the above-mentioned bivalent europium-activated barium fluorohalide phosphors (BaFX: $Eu^{2+}$), in particular, a phophor containing iodine as a part of halogen atom X has a high stimulated emission luminance. As the amount of iodine therein increases, the peak of the stimulated excitation spectrum, shifts toward the longer wavelength side. Accordingly, there has been proposed a method in which the phosphor is used in combination with a laser which emits light whose wavelength is in a red light region (for example, He—Ne laser), or a semiconductor laser which emits light whose wavelength is in a red light region or an infrared region, in accordance with a content amount of iodine.

The radiation image conversion panel itself generally deteriorates very little even with radiation or electromagnetic wave being irradiated thereto. Therefore, the radiation image conversion panel can be used repeatedly over a long period of time. Usually, the radiation energy stored in the panel is read by scanning a laser beam across the panel.

In practice, however, the stored radiation energy cannot be completely emitted from the panel only by using a scanning laser beam. Accordingly, in order to forcibly emit the radiation energy remaining in the panel, there has been proposed, as is disclosed in Japanese Patent Application Laid-Open (JP-A) No. 56-11392, a method in which remaining radiation energy is erased by irradiating light of stimulated emission in an excitation wavelength region onto the entire radiation image conversion panel after the reading.

However, a radiation image conversion panel using a stimulable phosphor which contains iodine has some drawbacks. Generally, as in the case in which the radiation energy stored in the general stimulable phosphor is erased, the remaining radiation energy cannot be sufficiently removed or erased from the panel only by irradiating light emitted from a daylight fluorescent lamp onto the panel in a short time (e.g., several seconds to several minutes). Further, a portion of the remaining radiation energy is recovered (i.e., an after-image emerges) with the passage of time after the erasing.

In a case in which a radiation image conversion panel is repeatedly used, the above-described insufficient erasability adversely affects the quality of a formed image. On the other hand, when the time for erasing is increased for the purpose of complete erasing, the total time required for reading and erasing in a reading device increases. As a result, the processing ability of the device itself deteriorates, and excessive heat is generated in an eraser within the device. These are not preferable in terms of durability of the device and power conservation.

The above-mentioned bivalent europium-activated barium fluorohalide phosphor is generally prepared by the following method.

First, a mixture of phosphor materials is prepared by a dry process in which the phosphor materials are homogeneously mixed in a dry state, or a wet process in which the phosphor materials are homogeneously mixed together in a slurry state and then dried.

Next, the obtained mixture of the phosphor material is fired (burned) ordinarily at a temperature near a melting point of a host crystal (Ba, FX, and the like) in a neutral to weakly oxidizing atmosphere at substantially atmospheric pressure for several hours (firing step). The obtained fired product may be further fired if desired. The firing step allows growth of the host crystal of the phosphor, and at the same time, diffuses activator elements (Eu and the like) in the host crystal. Further, an $F^+$-center which serves as a central source of stimulation is also generated. Accordingly, the firing step is an important step which exerts an influence upon the light emission characteristics of the phosphor.

After the firing step, the obtained phosphor is subjected to washing, classification, and the like, if necessary.

Further, JP-A Nos. 7-233369 and 10-195431 each disclose a method for preparing a rare earth-activated, alkaline earth metal fluorohalide based stimulable phosphor having a tetradecahedral structure (which hereinafter is simply referred to as a "tetradecahedron-structured phosphor" upon occasion) in which the particle shape and the particle aspect ratio are controlled.

In a radiation image conversion panel having a stimulable phosphor layer which contains the above-mentioned tetradecahedron-structured phosphor, the tetradecahedron-structured phosphor itself has no isotropy and is structured with a low directionality in the stimulable phosphor layer. Therefore, the transverse extension of the excitation light and the stimulated emission can be lessened, and the sharpness of a radiographic image formed on the radiation image conversion panel can be improved. The emission characteristics and sharpness of the tetradecahedron-structured phosphor obtained by the preparation methods disclosed in the above-mentioned publications are high. However, the amount of stimulated emission of this phosphor has not been sufficient for radiation conversion methods. Further, the phosphor does not have erasability sufficient for easy erasure. Therefore, there has been demand for further improvement in the amount of stimulated emission and erasability of the phosphors.

A method for improvement in the erasability of a stimulable phosphor is disclosed in, for example, JP-A No. 8-231952. In this method, a mixture of phosphor materials is fired to obtain an intermediate product. This intermediate product is thereafter annealed at a temperature lower than the firing temperature in the firing step, in a flow of atmospheric gas which slightly oxidizes the intermediate product. However, this method has problems in that determining the respective operation conditions, such as deciding upon the intermediate product, controlling the respective temperatures during the firing and annealing, determining an annealing time, and determining the conditions under which the oxidized gas flows, are complicated. Further, it is not clear what conditions contribute to improvements in the erasability of the stimulable phosphor.

As described above, under the existing circumstances, factors for determining the erasability of a stimulable phosphor have not been made clear. For this reason, the best conditions for preparation which provide a sufficient amount of stimulated emission and improve erasability cannot be determined. Therefore, a radiation image conversion panel with excellent erasability cannot be prepared in a stable manner, and problems arise with regard to the stability of the preparation.

SUMMARY OF THE INVENTION

The present invention has been devised to address the above-described problems and achieve the following object. Namely, an object of the present invention is to provide a method for preparing a barium fluorohalide phosphor by which method a stimulable phosphor having a sufficient amount of stimulated emission and erasability sufficient for easy erasure can be stably prepared.

After thoroughly studying a method for preparing a barium fluorohalide based phosphor in a stable manner, the present inventors have found that an excellent effect can be achieved by the following: in a firing step, a mixture of phosphor materials is fired at a constant temperature, and thereafter, the atmosphere at the time of the above-mentioned firing is removed while being maintained at the above constant temperature and replaced with an atmosphere different from the atmosphere, and subsequently, the mixture is subjected to annealing. Further, the present inventors have found that another excellent effect can be obtained by providing, after the firing step in which the mixture of phosphor materials has been fired, a step of removing the atmosphere at the time of firing and replacing with an atmosphere different from the atmosphere and cooling step(s) in which the obtained fired product is cooled at ordinary temperature in that atmosphere while the fired product is shut off from outside air.

The present inventors have found that, by providing these steps, a stimulable phosphor excellent in the amount of stimulated emission and erasability is obtained and this stimulable phosphor can be prepared in a stable manner.

Means for addressing the above-described problems are as follows.

A first aspect of the present invention is a method of preparing a barium fluorohalide phosphor represented by the formula $(Ba_{1-a}, M''_a) FX \cdot bM^I \cdot cM^{III} \cdot dA: xLn$, wherein $M''_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Ti, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0 \leq a \leq 0.3$, $0 < b \leq 2$, $0 \leq c \leq 2$, $0 \leq d \leq 0.5$, and $0 < x \leq 0.2$, respectively, the method comprising the steps of: (a) preparing a mixture of phosphor materials; (b) firing the mixture of phosphor materials by the substeps: (i) burning the mixture of phosphor materials in an atmosphere at a substantially constant temperature; and (ii) removing the atmosphere and replacing with a different atmosphere while maintaining the substantially constant temperature; and (c) annealing the mixture of phosphor materials.

A second aspect of the present invention is a method of preparing a barium fluorohalide phosphor represented by the formula $(Ba_{1-a}, M''_a) FX \cdot bM^I \cdot cM^{III} \cdot dA: xLn$, wherein $M''_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Tl, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0 \leq a \leq 0.3$, $0 < b \leq 2$, $0 \leq c \leq 2$, $0 \leq d \leq 0.5$, and $0 < x \leq 0.2$, respectively, the method comprising the steps of: (a) preparing a mixture of phosphor materials; (b) firing the mixture of phosphor materials in a neutral to weakly reducing atmosphere; (c) removing the neutral to weakly reducing atmosphere and introducing a first different atmosphere; (d) cooling the mixture of phosphor materials; (e) removing the first different atmosphere and introducing a second different atmosphere; and (f) cooling the mixture of phosphor materials.

A third aspect of the present invention is a method of preparing a barium fluorohalide phosphor represented by the formula $(Ba_{1-a}, M''_a) FX \cdot bM^I \cdot cM^{III} \cdot dA: xLn$, wherein $M''_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Ti, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0 \leq a \leq 0.3$, $0 < b \leq 2$, $0 \leq c \leq 2$, $0 \leq d \leq 0.5$, and $0 < x \leq 0.2$, respectively, the method comprising the steps of: (a) preparing a mixture of phosphor materials; (b) firing the mixture of phosphor materials in a neutral to weakly reducing atmosphere; (c) removing the neutral to weakly reducing atmosphere and replacing with a partial vacuum, and if not a partial vacuum, then a neutral gas atmosphere; and (d) cooling the mixture of phosphor materials.

In the method of preparing a barium fluorohalide phosphor according to the first aspect of the present invention, after a mixing step in which a mixture of phosphor materials are mixed together, in a firing step, the mixture of phosphor materials are fired at a constant temperature. Thereafter, the atmosphere at the time of the firing is removed while being maintained at the constant temperature, and is replaced with an atmosphere different from the atmosphere at the time of the firing. Then, an annealing step is conducted. If necessary, a cooling step and other steps may be provided after the firing step and the annealing step.

The method of preparing a barium fluorohalide phosphor according to the second aspect of the present invention includes the following steps. After a mixing step in which a mixture of phosphor materials are mixed together and a firing step in which the mixture of phosphor materials is fired at a constant temperature, in a state in which the fired product is shut off from outside air, the atmosphere at the time of the firing is removed and replaced with a first atmosphere different from the atmosphere at the time of the firing, and thereafter, first cooling is carried out. Then, the first atmosphere is removed and replaced with a second atmosphere, and second cooling is carried out. Other steps may optionally be provided.

The method according to the third aspect of the present invention includes steps in which, in a state where the fired product is shut off from outside air, the atmosphere at the time of the firing is removed and replaced with vacuum or a neutral gas atmosphere, and cooling is carried out. Other steps may optionally be provided. Further, a combination of the first aspect and the second or third aspect described above is also preferable. In this case, "the weakly oxidizing atmosphere" at the time of the firing in the second or third aspect refers to, in the first aspect, "the oxidizing atmosphere" which is introduced for replacement after the removal of the atmosphere at the time of the firing and in which the annealing is carried out. The removing and replacing or introducing of the first, second and third aspects of the present invention are conducted while the fired product is shut off from outside air. In a case in which the first aspect and the second or third aspect are carried out in combination, the atmosphere at the time of the annealing in the first aspect is made to be different from the atmosphere at the time of the first cooling step in the second or third aspect.

DESCRIPTION OF THE PREFERRED EMBODIMENTS

Hereinafter, a method of preparing a barium fluorohalide phosphor according to the present invention will be described in detail.

Mixing Step

First, a mixture of phosphor materials is prepared in a mixing step in which desired phosphor materials are mixed. Examples of the phosphor materials include the following materials (1) to (5):

(1) at least one-barium halide selected from the group consisting of $BaF_2$, $BaCl_2$, $BaBr_2$ and $BaI_2$;

(2) at least one alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$ and $MgI_2$;

(3) at least one alkaline metal halide selected from the group consisting of CsCl, CsBr, CsI, NaCl, NaBr, NaI, KCl, KBr, KI, PbCl, PbBr, PbI, PbF, CsF, NaF, KF, LiF, LiCl, LiBr and LiI;

(4) at least one metal oxide selected from the group consisting of $Al_2O_3$, $SiO_2$ and $ZrO_2$; and (5) at least one compound selected from the group consisting of rare earth element compounds such as halide, oxide, nitrate and sulfate.

If desired, ammonium halide ($NH_4X'$; wherein X' is F, Cl, Br or I) or the like may be used as a flux.

The preparation of the mixture of phosphor materials is carried out by arbitrarily selecting desired materials from each of the materials (1) to (5) and stoichiometrically measuring by weight and mixing the materials at a relative compounding ratio corresponding to the above-mentioned compositional formula (I).

The method of preparing the mixture of phosphor materials can be appropriately selected from well known mixing methods. For example, the mixture of phosphor materials may be prepared by any one of the following processes (i) to (iv):

(i) the phosphor materials (1) to (5) are measured and simply mixed;

(ii) the phosphor materials (1) to (4) are measured and mixed, and thereafter, a resultant mixture is heated at a temperature of 100° C. or more for several hours, and the phosphor material (5) is mixed with a resultant heat-treated product;

(iii) the phosphor materials (1) to (5) are mixed together and a resultant mixture is heated at a temperature of 100° C. or more for several hours; and (iv) the phosphor materials (1) to (4) are mixed in a state of suspension, with the obtained suspension being dried under reduced pressure, vacuum drying, or spray drying while being heated (preferably to 50 to 200° C.), and thereafter, the phosphor material (5) is mixed with the obtained dry product.

Further, the following processes (iv-2), (iv-3) and (iv-4) can be favorably included as examples of modifications of the above-described preparation process (iv):

(iv-2) the phosphor materials (1) to (5) are mixed in a state of suspension, and a resultant suspension is dried;

(iv-3) a suspension containing the phosphor materials (1) and (5) is heated preferably to 50 to 200° C. or dried under reduced pressure, vacuum drying, or spray drying while being heated to the above-mentioned temperature, and thereafter, the phosphor materials (2) to (4) are added to and mixed with the obtained mixture; and (iv-4) in a case in which a mixture is prepared by carrying out firing two times or more, the phosphor materials (1) and (2) are mixed in a state of suspension, the phosphor materials (3) and (4) are mixed with a resultant suspension after primary firing, and a resultant suspension is dried under reduced pressure, vacuum drying, or spray drying while being heated preferably to 50 to 200° C., and thereafter, the phosphor material (5) is mixed with the obtained dry product.

Further, in addition to the processes (i) to (iv-4), a method, which has previously been mentioned in JP-A Nos. 7-233369 and 10-195431 for preparing a rare earth-activated, alkaline earth metal fluorohalide based stimulable phosphor having a tetradecahedral structure in which the particle shape and the particle aspect ratio are controlled, may also be used. Namely, the method of preparing the mixture of phosphor materials can also include a preparing process (v) in which means for applying shearing force at the time of mixing phosphor materials is used, and/or a preparing process (vi) in which means for controlling various conditions including addition of various phosphor materials, a timing of mixing, and the like.

A mixing device used for the mixing in the above-described preparing processes (v) and (vi) can be appropriately selected from well known mixing devices and used. Examples of the mixing device include various mixers, a V-type blender, a ball mill, a rod mill, and the like.

Firing Step

Next, a description will be given of a firing step in which the mixture of phosphor materials obtained in the mixing step is fired to obtain a fired product.

The mixture of phosphor materials obtained in the mixing step is packed into a heat resistant container such as a quartz boat, an alumina crucible, a quartz crucible, or a silicon-carbide container, and is placed and fired in a reactor core of a furnace.

A furnace used in the above-described firing needs to have a firing region whose volume is 2 to 500 L, preferably 5 to 50 L, for 1 kg of the mixture of phosphor materials.

When the volume of the firing region is less than 2 L for 1 kg of the mixture of phosphor materials, the phosphor is tightly packed in a small space, and therefore, uniform firing becomes difficult. When the volume of the firing region exceeds 500 L, a volatilized halogen atmosphere is too weak, and the stimulated emission amount, erasability and the like of the obtained stimulable phosphor may deteriorate.

The firing temperature of the mixture of phosphor materials is preferably a constant temperature in the range of 500 to 1000° C., more preferably in the range of 550 to 1000° C., and most preferably in the range of 600 to 900° C.

When the firing temperature is low, diffusion of activator elements in the host crystal and generation of an $F^+$-center which serves as a central source of stimulation may not be sufficient. When the firing temperature exceeds 1000° C., the host crystal may melt.

The firing time is generally 0.5 to 6 hours, preferably 1 to 3 hours, although it varies depending on the amount of the mixture of phosphor materials packed, firing temperature, temperature at which the mixture is taken out from a furnace, and the like.

When the firing time is less than 0.5 hour, diffusion of activator elements in the host crystal and generation of an $F^+$-center which serves as a central source of stimulation may not be sufficient. Even if the firing is carried out for more than 6 hours, there is little change in the characteristics of the phosphor, and productivity may be deteriorated.

In the first aspect of the present invention, an atmosphere in a furnace in the firing step can be selected from a neutral atmosphere, a weakly reducing atmosphere, and an oxidizing atmosphere. In the second and third aspects, an atmosphere in a furnace is preferably a neutral atmosphere or a slightly oxidizing atmosphere.

Examples of the neutral atmosphere include neutral atmosphere containing inert gas such as a nitrogen gas atmosphere, an argon gas atmosphere, a helium gas atmosphere, a neon gas atmosphere, and the like. Examples of the weakly reducing atmosphere include a nitrogen gas atmosphere containing a small amount of hydrogen gas, a carbon dioxide atmosphere containing carbon monoxide, and the like. When a trivalent europium compound is contained as a rare earth element of the phosphor materials, the trivalent europium is reduced to a bivalent europium in the firing step.

A slightly oxidizing gas atmosphere is preferably used as the oxidizing atmosphere in the first aspect.

The slightly oxidizing gas atmosphere refers to a weakly oxidizing atmosphere containing 100 to 100000 ppm, preferably 150 to 50000 ppm of oxygen per unit volume of neutral gas. An example of the slightly oxidizing gas atmosphere is a weakly oxidizing gas atmosphere containing oxygen at the above-described concentration in inert gas such as He, Ne, Ar, $N_2$, or the like.

The amount of oxygen introduced is preferably 0.1 to 200 ml, and more preferably 0.2 to 100 ml at room temperature per 1 L of the volume of the firing region in the furnace.

When the amount of oxygen introduced is less than 0.1 ml, effects of improvement in erasability may not be sufficient. When the amount of oxygen introduced exceeds 200 ml, an amount of stimulated emission may remarkably deteriorate.

Methods which will be described below can be used as methods of introducing oxygen into neutral gas prior to cooling or firing or as methods of removing and replacing an atmosphere prior to annealing. These methods are not particularly limited and can be appropriately selected from well known introducing methods. However, preferable among well known methods is a method in which, after the interior of a furnace is once brought to near vacuum due to exhaust of air therefrom, a predetermined amount of oxygen is introduced into the furnace and firing is carried out within the furnace in a weakly oxidizing atmosphere. In this way, the required amount of oxygen can be accurately introduced into the furnace, and at the same time, influences of other gases can be minimized.

Oxygen required for improvement in erasability of the stimulable phosphor can be introduced in the step of firing the mixture of phosphor materials by regulating the volume of the firing region for 1 kg of the mixture of phosphor materials to be fired and the amount of oxygen introduced for 1 L of the volume of the firing region.

Further, by replacing gas within the furnace with a gas containing a predetermined amount of oxygen, the amount of oxygen within the furnace can be introduced so as to increase in a stepwise manner or continuously.

A desired amount of oxygen is introduced by, for example, the following procedure.

First, immediately after the mixture of phosphor materials has been placed in an electric furnace whose temperature has reached the firing temperature, evacuation is carried out for several minutes to exhaust air from the reactor core. At this time, although firing can be carried out as long as the interior of the furnace is under near vacuum, the degree of vacuum is desirably 0.1 torr or less, since the amount of oxygen existing in the atmosphere needs to be properly specified.

Subsequently, a predetermined amount of oxygen is supplied to the interior of the furnace and charged to a desired atmospheric pressure. At this time, the amount of oxygen introduced is, as described above, preferably 0.1 to 200 ml per 1 L of the volume of the firing region in the furnace. The amount of oxygen introduced is measured at room temperature.

After the predetermined amount of oxygen has been properly introduced into the furnace, the above-described neutral gas (inert gas) is further introduced into the furnace and the pressure within the furnace is adjusted to be about 760 torr (1 atm.), that is, a pressure value in the vicinity of atmospheric pressure. An oxidizing atmosphere can be thereby formed within the furnace. A weakly oxidizing atmosphere can be formed in the same way.

When the atmosphere within the furnace is adjusted to be a weakly oxidizing atmosphere, for example, oxygen-containing gas such as air, or oxygen-containing inert gas may be introduced into the furnace in place of oxygen.

In general, as the amount of oxygen-containing gas introduced such as air, an amount of gas required to have the same amount of oxygen as that in the above case in which only oxygen is introduced is preferably introduced. However, the amount of oxygen-containing gas introduced is more preferably in the range of 0.5 to 1000 ml per 1 L of the volume of the firing region in the furnace, and most preferably in the range of 5 to 500 ml.

The introduction of oxygen into the furnace may be carried out before or after evacuation, or without evacuation. For example, an extremely small amount of oxygen may merely be introduced into the reactor core under a neutral gas atmosphere or a weakly oxidizing atmosphere. Alternatively, the introduction of oxygen may be carried out so that the amount of oxygen within the furnace is increased due to gas which contains oxygen being introduced into the furnace.

Moreover, the firing can be performed two or more times. When the firing is performed two or more times, for example, the mixture of phosphor materials is once fired, and thereafter, the fired product is taken out from an electric furnace and allowed to stand for cooling, and is further pulverized into fine powder by an ordinary pulverizer such as a mortar, a ball mill, a tube mill, or a centrifugal mill, if necessary. The pulverized product is fired again in the electric furnace, and the latter firing (the final firing) is preferably carried out under the above-described firing conditions.

It is more preferable that the firing is carried out as in the following: the mixture of phosphor materials is once fired at a firing temperature in a range of 900 to 1300° C. (first firing), and thereafter, the fired product is taken out and pulverized in the above-described manner, and the pulverized product is further fired at a temperature lower than the above-described firing temperature, preferably at a temperature in a range of 400 to 1000° C. (final firing).

A powdered stimulable phosphor is obtained by the above-described firing step.

Annealing Step

In the preparation method according to the present invention, an annealing step is preferably provided prior to a cooling step and subsequent to the firing step in which the mixture of phosphor materials are fired at a constant temperature as described above.

The annealing may be carried out immediately after the mixture of phosphor materials has been fired. It is preferable, however, that the annealing is carried out after a certain period of time after which a constant temperature is maintained and removal and replacement of the atmosphere are carried out.

Hereinafter, annealing in accordance with the first aspect of the present invention will be described.

Subsequent to a step in which the mixture of phosphor materials has been burned at a substantially constant temperature (this step is called a "burning substep"), the atmosphere is removed and replaced with a different atmosphere while the constant temperature is maintained (this step is called a "replacing substep"). Thereafter, annealing is carried out on the obtained mixture of phosphor materials (this step is called an "annealing step").

The removal and replacement of the atmosphere are carried out while the interior of the furnace is shut off from outside air and maintained at a constant temperature.

The atmosphere within the furnace in the firing step is preferably removed by evacuating to vacuum or near vacuum while the interior of the furnace is shut off from outside air. It is more preferable that the degree of vacuum is 0.1 torr or less, since the amount of oxygen existing in the atomosphere needs to be properly specified.

The removal of the atmosphere at the time of the firing is preferably carried out after approximately ⅓ of the time required for the firing is elapsed, to substantially all of the time required for the firing has elapsed, during which the mixture is fired at a constant temperature.

If the removal of the atmosphere is carried out after less than ⅓ of the time required for the firing step has elapsed, the light emission characteristics of the obtained stimulable phosphor may deteriorate.

An oxidizing atmosphere is preferable as the atmosphere different from that in the firing step with which the atmosphere in the firing step is replaced. In the first aspect of the invention, the annealing step is preferably carried out after the atmosphere in the firing step, which is a neutral to weakly reducing atmosphere, is removed and replaced with an oxidizing atmosphere.

Further, a weakly oxidizing atmosphere is preferable as the oxidizing atmosphere. A weakly oxidizing atmosphere containing 0.1 to 200 ml of oxygen per 1 L of atmosphere is more preferable, and a weakly oxidizing atmosphere containing 1 to 100 ml of oxygen per 1 L of atmosphere is most preferable.

An example of the weakly oxidizing atmosphere is a weakly oxidizing gas atmosphere or the like which contains oxygen of the aforementioned concentration in inert gas such as He, Ne, Ar, $N_2$, or the like.

Moreover, when an oxidizing atmosphere is used in the firing step, the replacing atmosphere is preferably a more weakly oxidizing atmosphere than the atmosphere in the firing step.

The oxygen introduction method used in the case where the atmosphere at the time of the firing is replaced with an oxidizing atmosphere or a weakly oxidizing atmosphere is not particularly limited and can be selected from well known introduction methods. Further, the methods described above as oxygen introduction methods can be preferably used or carried out as well.

The annealing step which is carried out after the removal and replacement of the atmosphere in the furnace may be carried out immediately after completion of the firing step at a constant temperature. However, the annealing step is preferably carried out after a predetermined time has passed during which the temperature within the furnace is maintained at the constant temperature and the removal and replacement of the atmosphere is carried out.

The predetermined time is preferably in a range of 0 to 240 minutes, and more preferably in a range of 30 to 180 minutes.

When the predetermined time exceeds 180 minutes, the light emission characteristics of the obtained stimulable phosphor may deteriorate.

Annealing may be optionally carried out. However, if this annealing is carried out in the annealing step in the first aspect of the present invention, unexpected effects can be obtained.

In the annealing step, the temperature is controlled so as to slowly decrease from a temperature at which the annealing is started to a predetermined temperature. The temperature is decreased at a rate of preferably 0.2 to 5° C./minute, and more preferably 0.5 to 3° C./minute.

When the aforementioned rate is less than 0.2° C./minute, the light emission characteristics may deteriorate. When the rate exceeds 5° C./minute, on the other hand, erasability may not be sufficiently improved.

Further, it is preferable that annealing is carried out until the temperature reaches a temperature which is 20 to 300° C., preferably 50 to 300° C., and more preferably 100 to 250° C. lower than the temperature at which the annealing is started.

When the difference between the temperature at which the annealing is started and the temperature at which the annealing is completed is small, erasability may not be sufficiently improved. When the difference exceeds 300° C., the light emission characteristics may deteriorate.

Moreover, the annealing time, at which the temperature is decreased from the temperature at which the annealing is started to the predetermined temperature after the replacement of the atmosphere, is preferably in a range of 30 to 180 minutes, and more preferably in a range of 60 to 150 minutes.

When the annealing time is less than 30 minutes, erasability may not be sufficiently improved. On the other hand, when the annealing time exceeds 180 minutes, the light emission characteristics may deteriorate.

Cooling Step(s)

In the preparation method of the present invention, after the firing step, the stimulable phosphor is subjected to a cooling step so as to be cooled to an ordinary temperature.

The cooling step is not limited to a particular step and can be properly selected from well known cooling methods. For example, cooling is carried out by allowing to stand for cooling, quenching, or the like. However, by carrying out the removing and replacing step and the cooling step in the second or third aspect of the present invention which will be described below, unexpected effects such as sufficient amount of stimulated emission, sufficient erasability, and the like can be obtained.

The removing and replacing steps and the cooling steps of the second aspect of the present invention will be described in detail.

In the preparation method according to the second aspect of the present invention, removing and replacing steps and cooling steps are carried out after the firing step. These cooling steps are carried out in the following manner. After a neutral to oxidizing atmosphere (a weakly oxidizing atmosphere is particularly preferable) at the time of the firing has been removed in a state in which the interior of the furnace is shut off from outside air, the atmosphere is replaced with a first different atmosphere which is different from the atmosphere at the time of the firing, and first cooling is carried out. Subsequently, the first atmosphere is removed and replaced with a second atmosphere, and then second cooling is carried out.

The cooling steps may be carried out immediately after the firing step in which the annealing step is optionally conducted. Further, it is preferable that in the step of removing and replacing the neutral to weakly reducing atmosphere, removing is performed while cooling is conducted. However, in terms of preparation of a stimulable phosphor having a sufficient amount of stimulated emission and sufficient erasability, it is preferable to carry out the removing and replacing steps and the cooling steps under the following conditions: after the firing step has been completed and heating of the furnace has been stopped, while the neutral to weakly oxidizing atmosphere at the time of the firing is removed, the temperature within the furnace or the temperature of the surface of the fired product is lowered from a temperature at the time of the firing $T_1$ to a desired constant temperature, which is a first cooling starting point $T_2$. The cooling step is preferably carried out after the temperature has reached the first cooling starting point $T_2$. As well as the temperature at the time of the firing $T_1$, the first cooling starting point $T_2$ refers to a temperature within the furnace or a temperature of the surface of the fired product.

The first cooling starting point $T_2$ is preferably 30° C. lower than the temperature at the time of the firing $T_1$. The first cooling starting point $T_2$ is more preferably in a range of 300 to 750° C., and most preferably in a range of 400 to 650° C.

When the difference between the temperature at the time of the firing $T_1$ and the first cooling starting point $T_2$ is less than 30° C., or when the first cooling starting point $T_2$ is less than 300° C. or more than 750° C., sufficient erasability may not be obtained.

More specifically, the temperature is lowered from the temperature at the time of the firing $T_1$ to the first cooling starting point $T_2$ while the neutral to weakly oxidizing atmosphere at the time of the firing is removed. Once the temperature reaches the first cooling starting point $T_2$, the atmosphere is replaced with the first atmosphere and the first cooling is started.

After the first cooling has been started, once the temperature within the furnace or the temperature of the surface of the fired product reaches a second cooling starting point $T_3$, the first atmosphere is evacuated and is replaced with the second atmosphere, and then second cooling is started. The second cooling starting point $T_3$ refers to a temperature within the furnace or a temperature of the surface of the fired product.

When the neutral to weakly oxidizing atmosphere at the time of the firing, or the first atmosphere is removed, the atmosphere is preferably removed by evacuating to vacuum or near vacuum. Preferably, the atmosphere is removed so that the degree of vacuum is 1 torr or less.

In the case of replacing an atmosphere, the atmosphere may be gradually replaced with a new atmosphere while being mixed therewith. However, from the standpoint of correctly controlling replacement efficiency and the amount of oxygen within the furnace, the atmosphere is preferably replaced with a different atmosphere after being completely removed.

The second cooling starting point $T_3$ is preferably in a range of 200 to 600° C., and more preferably in a range of 300 to 500° C.

When the second cooling starting point $T_3$ is less than 200° C., the amount of stimulated emission may be decreased. On the other hand, when the second cooling starting point $T_3$ exceeds 600° C., sufficient erasability may not be obtained.

Further, the cooling speed from the first cooling starting point $T_2$ to the second cooling starting point $T_3$ is preferably 1 to 5° C. per second, and more preferably 0.3 to 2° C. per second.

In the first cooling, it is preferable that the first atmosphere different from the atmosphere at the time of the firing is introduced when the temperature reaches the first cooling starting point $T_2$, since a stimulable phosphor having a sufficient amount of stimulated emission and sufficient erasability can be obtained in a stable manner. Further, for the same reason, in the second cooling, the second atmosphere is preferably introduced when the temperature reaches the second cooling starting point $T_3$.

The preparation method according to the second aspect of the present invention preferably includes steps in which the first atmosphere used for the first cooling is a weakly oxidizing atmosphere different from the atmosphere at the time of the firing, and the second atmosphere is vacuum.

The weakly oxidizing atmosphere which is different from the atmosphere at the time of the firing and is used as the first atmosphere is a substantially nitrogen atmosphere containing preferably 0.0001 to 10 ml, and more preferably 0.001 to 2 ml of oxygen per 1 L of atmosphere by volume.

In particular, when the atmosphere at the time of the firing is a neutral atmosphere, employing a weakly oxidizing atmosphere as the first atmosphere is useful in that erasability of the stimulable phosphor can be improved. On the other hand, when the atmosphere at the time of the firing is an oxidizing to weakly oxidizing atmosphere, if a weakly oxidizing atmosphere containing the same concentration of oxygen is used as the first atmosphere, the oxygen content may be too high to stably prepare a stimulable phosphor having a sufficient amount of stimulated emission and sufficient erasability. Therefore, as the first atmosphere, a weakly oxidizing atmosphere containing an oxygen concentration lower than that of the atmosphere at the time of the firing, or a neutral atmosphere is preferably used.

The degree of vacuum of the second atmosphere is more preferably 1 torr or less.

In the preparation method according to the second aspect of the present invention, also preferable are steps in which the first atmosphere used for the first cooling is a weakly oxidizing atmosphere different from the atmosphere at the time of the firing, and the second atmosphere is a neutral gas atmosphere.

The weakly oxidizing atmosphere different from the atmosphere at the time of the firing is preferably the weakly oxidizing atmosphere same as described above.

The neutral gas atmosphere may be a substantially neutral gas atmosphere containing a trace quantity of oxygen. In this case, however, a neutral gas atmosphere containing a concentration of oxygen lower than that of the first atmosphere is preferable. An atmosphere which is substantially inert with respect to the fired product is more preferable. Most preferable is an inert gas atmosphere which is any of $N_2$, Ar and He not containing oxygen or a mixture thereof.

A removing and replacing step and a cooling step of the third aspect of the present invention will be described in detail.

The removing and replacing step and the cooling step according to the third aspect of the present invention are preferable. In these steps, a neutral to weakly oxidizing atmosphere at the time of the firing is removed while the interior of the furnace is shut off from outside air. Subsequently, the interior of the furnace is brought into vacuum and cooled. Alternatively, a neutral gas atmosphere different from the neutral atmosphere is introduced, and the interior of the furnace is cooled.

In these cases, the atmosphere within the furnace after the neutral to weakly oxidizing atmosphere at the time of the firing has been removed is preferably an atmosphere which has a small content of active materials such as oxygen, from a standpoint of preparing a stimulable phosphor having a sufficient amount of stimulated emission and sufficient erasability. However, the atmosphere within the furnace does not necessarily have to be an atmosphere containing no active materials. Any atmosphere can be used as long as it is substantially inert with respect to the fired product even if a trace quantity of oxygen at the time of the firing exists in it or a trace quantity of active materials from the outside is contained in it.

In a case where firing is carried out in a neutral atmosphere, due to this atmosphere being removed by evacuation, or due to this atmosphere being removed and replaced with a neutral atmosphere different from the atmosphere at the time of the firing, the cooling step can be carried out in an atmosphere in which impurities and the like generated at the time of the firing have been removed. Therefore, deterioration in characteristics of a stimulable phosphor can be prevented.

In a case in which the neutral to weakly oxidizing atmosphere at the time of the firing is removed, the interior of the furnace is brought into vacuum, and cooling is carried out, the following steps may be preferably carried out. After the firing step has been completed and heating of the furnace has been stopped, the temperature within the furnace or the temperature of the surface of the fired product is decreased to the first cooling starting point $T_2$ while the atmosphere at the time of the firing is removed until the interior of the furnace is brought to vacuum or near vacuum. In this case, the degree of vacuum is preferable 10 torr or less, and more preferably 1 torr or less.

In a case in which the cooling step is carried out after the neutral to weakly oxidizing atmosphere has been removed and replaced with a neutral gas atmosphere, the steps which are the same as the steps of the second aspect can be carried out prior to the cooling step. Namely, after the firing step has been completed and heating of the furnace has been stopped, the temperature $T_1$, which is a temperature within the furnace or the temperature of the surface of the fired product, is decreased to a constant temperature, which is the first cooling starting point $T_2$, while the atmosphere at the time of the firing is removed. When the temperature reaches the first cooling starting point $T_2$, a neutral gas atmosphere-is introduced within the furnace, and then the cooling step is carried out.

When the temperature within the furnace or the temperature of the surface of the fired product is decreased to the first cooling starting point $T_2$ while the atmosphere is removed, the first cooling starting point $T_2$ is preferably 30° C. or more lower than the temperature at the time of the firing $T_1$.

When the neutral to weakly oxidizing atmosphere is removed, it is preferably removed until it is brought into vacuum or near vacuum, and more preferably until the degree of vacuum becomes 1 torr or less.

Moreover, when the atmosphere is replaced, it may be removed gradually while the neutral atmosphere is mixed with the weakly oxidizing atmosphere at the time of the firing. However, in terms of accurate control of the replacement efficiency and the amount of oxygen in the furnace, the atmosphere is preferably replaced with the neutral gas atmosphere after the weakly oxidizing atmosphere at the time of the firing has been removed.

The neutral gas atmosphere is preferably the same as that used in the cooling steps in which the above-described first and second coolings are carried out.

In the present invention, cooling in the cooling steps may be carried out either by a method in which the fired product is allowed to stand so that the temperature thereof decreases, or a method in which the temperature of the fired product is controlled by a cooler and is made to decrease. However, the latter method is preferable in terms of shortened cooling time and a stimulable phosphor having sufficient characteristics being able to be prepared in a stable manner.

Others

Further, various general steps such as a washing step, a drying step, a sieving step, and the like can optionally be provided after the firing step or the cooling step.

In the present invention, examples of a device used for removing a gas atmosphere within the furnace include a rotary pump, an aspirator, and the like. Among these devices, a rotary pump is preferable in terms of pumping speed and ultimate vacuum. Stimulable Phosphor The above-described preparing method of the present invention can be used to stably prepare a barium fluorohalide phosphor represented by the compositional formula (I) below.

Further, the stimulable phosphor prepared by the preparing method of the present invention has a sufficient amount of stimulated emission and sufficient erasability. Therefore, high quality image can be formed in a stable manner by using this stimulable phosphor.

(I)

wherein, $M^{II}_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Tl, Sc, Y, Cd and Lu (except $Al_2O_3$).

In this formula, an alkali metal compound represented by $M^I$ and a trivalent metal compound represented by $M^{III}$ are halides, oxides, sulfides, carbonates, or the like.

In this formula, X is at least one halogen selected from the group consisting of Cl, Br and I. Ln is at least one rare earth element selected from the group consisting of Ce, Pr, Sm, Eu, Gd, Tb, Dy, Pr, Ho, Nd, Er, Tm and Yb. A is at least one metal oxide selected from the group consisting of $Al_2O_3$, $SiO_2$ and $ZrO_2$.

Further, a, b, c, d and x are $0 \leq a < 0.3$, $0 \leq b \leq 2$, $0 \leq c \leq 2$, $0 \leq d$ 0.5, and $0 < x \leq 0.2$, respectively.

When the stimulable phosphor represented by the compositional formula (I) is prepared, various additive components as will be described below can be added for the purpose of further improvement in the amount of stimulated emission, erasability, and the like.

Examples of such additive components include B (boron) disclosed in JP-A No. 57-23673, As (arsenic) disclosed in JP-A No. 57-23675, a tetrafluoroborate compound disclosed in JP-A No. 59-27980, a hexafluoro compound disclosed in JP-A No. 59-47289, transition metals such as V, Cr, Mn, Fe, Co and Ni disclosed in JP-A No. 59-56480, and $BeX''_2$ (wherein X'' is at least one halogen selected from the group consisting of F, Cl, Br and I) disclosed in JP-A No. 59-75200.

In a case in which these additive components are added, the additive components are added and mixed at the time of measuring and mixing phosphor materials or prior to the firing of the phosphor materials.

EXAMPLES

Next, examples of the present invention will be described, but the present invention is not limited by these examples.

Example 1

Mixing Step 1200 ml of an aqueous solution of barium bromide ($BaBr_2$) (2.5 mol/L), 40 ml of an aqueous solution of europium bromide ($EuBr_3$) (0.2 mol/L), and 0.85 g of a dihydrate of calcium bromide ($CaBr_2.2H_2O$) were added to 1760 ml of distilled water ($H_2O$), and the resulting solution was mixed and stirred to obtain a suspension ($BaBr_2$ concentration: 1.0 mol/L).

The resulting suspension was maintained at 60° C. and stirred by rotating at 500 rpm a screw-type stirring blade having a diameter of 60 mm.

On the other hand, 150 ml of an aqueous solution of ammonium fluoride (10 mol/ml) and 150 ml of water were mixed, and 300 ml of the resulting mixed solution was injected, by a rotary pump with a pumping speed of 5 ml/minute, into the suspension which is being stirred under incubation to prepare a precipitate.

After completion of the injection, the resulting mixture was stirred under incubation for two more hours so as to age the precipitate.

Next, the resulting precipitate was filtered and washed with 2 L of methanol. The washed precipitate was taken out and subjected to vacuum drying at 120° C. for 4 hours to obtain a crystal of europium-activated barium fluorobromide (BaFBr: Ca, Eu, precursor of phosphor). The yield was approximately 330 g.

As a result of observation by means of a scanning electron microscope, it was confirmed that the crystal had a tetradecahedral structure. Further, as a result of measuring this crystal by using an optical diffraction type particle size distribution measuring device (LA-500, manufactured by Horiba Seisakusho Co., Ltd.), the average size of the crystal was 4.9 μm.

To 100 g of the crystal of calcium added europium-activated barium fluorobromide (BaFBr: Ca, Eu, precursor of phosphor) obtained above, added were 21.2 g of barium fluoroiodide (BaFl), 0.06 g of cesium bromide (CsBr), and, for the purpose of preventing a change in the particle size distribution due to a change in the shape of the crystal at the time of the firing and fusion between particles, 1% by weight of ultra-fine particles of alumina. The resulting mixture was sufficiently stirred by a mixer, the surface of the crystal was treated uniformly, and a mixture of phosphor materials was obtained.

Firing Step 100 g of the obtained mixture of phosphor materials (BaFBr: Ca, Eu, precursor of phosphor) was loaded on a quartz boat, and thereafter, placed in a reactor core which can be evacuated (the volume of a firing region is 1.3 L). Immediately thereafter, exhaust of air was started and the degree of vacuum in the reactor core reached about 0.1 torr in 10 minutes. Subsequently, nitrogen gas was charged until the interior of the furnace was brought to substantially atmospheric pressure (760 torr) to be a neutral atmosphere. Then, the mixture of phosphor materials was fired at 850° C. for two hours in the electric furnace under the neutral atmosphere (firing step).

After the firing step, the interior of the furnace was evacuated by using a rotary pump and replaced with an oxidizing atmosphere containing 6 ml of oxygen per 1 L of the atmosphere for 30 minutes (replacing step). Thereafter, annealing was carried out by decreasing the temperature from 850° C., which is the annealing starting point, to 650° C. for 90 minutes with a temperature gradient of 2.2° C./minute (annealing step).

Cooling Step

After the annealing, the atmosphere was evacuated by using a rotary pump, and the fired product was quenched in the vacuum atmosphere until the temperature reached a room temperature. After completion of the cooling, the fired product was taken out from the furnace to obtain a BaFBrI: Eu stimulable phosphor (1) having a tetradecahedral structure.

Comparative Example 1

A BaFBrl: Eu stimulable phosphor (2) having a tetradecahedral structure was obtained in the same way as in Example 1, except that the replacing step and the annealing step which had been carried out after the firing step in Example 1 were not carried out.

Measurement of Stimulated Emission Amount

The stimulable phosphors (1) and (2) were each irradiated with 100 mR of an X-ray having tube voltage of 80 KVp, followed by the irradiation and excitation with an LD (laser diode whose wavelength is 660 nm) having an irradiation energy of 4.3 J/m$^2$. Subsequently, stimulated emission light radiated from the stimulable phosphor was received by a photomultiplier via a filter (B-410), and an initial stimulated emission amount of the phosphor was measured. The results are shown in Table 1 below. The greater the numerical value, the greater the stimulated emission amount. Evaluation of Erasability The stimulable phosphors (1) and (2) were each irradiated with 100 mR of an X-ray having tube voltage of 80 KVp, followed by the irradiation and excitation with an LD (whose wavelength is 660 nm) having an irradiation energy of 4.3 J/m$^2$. Subsequently, stimulated emission light radiated from the stimulable phosphor was received by a photomultiplier via a filter (B-410), and an initial stimulated emission amount was measured.

After the initial stimulated emission amount had been measured, the phosphor was subjected to an erasure operation by irradiating onto the phosphor with light emitted from a daylight fluorescent lamp at 5000 lux for 70 seconds. Thereafter, the phosphor was irradiated again with an X-ray and a laser in the same way as aforementioned, and the stimulated emission amount of the stimulable phosphor after erasure was measured.

Erasability of the phosphors is represented by an erasure value calculated in the following expression. As the numerical value becomes smaller, erasability improves. The obtained calculation results are given in Table 1.

Erasure value=(stimulated emission amount after the erasure/initial stimulated emission amount)

TABLE 1

| | Preparing steps | | | Stimulated | |
|---|---|---|---|---|---|
| | Firing step | Replacing step | Annealing step | emmision amount | Erasure value |
| Example 1 | Carried out | Carried out | Carried out | 80 | 2.80 E-05 |
| Comparative Example 1 | Carried out | None | None | 75 | 3.50 E-04 |

As is clear from Table 1, in Example 1 of the preparing method of the present invention in which, after the firing, the atmosphere at the time of the firing is removed while a constant temperature is maintained, and is replaced with an atmosphere different therefrom, and then annealing is carried out, a stimulable phosphor having a sufficient stimulated emission amount and sufficient erasability was able to be prepared.

On the other hand, in comparative example 1 in which the replacement of the atmosphere at the time of the firing with an atmosphere different from the atmosphere at the time of the firing, and the annealing were not carried out after the firing, a stimulable phosphor having a sufficient stimulated emission amount and sufficient erasability was not able to be prepared.

Example 2

Mixing Step

Mixing was carried out and a mixture of phosphor materials was obtained in the same way as in Example 1 except that the average crystal size of the obtained europium-activated barium fluorobromide was 5.0 μm.

Firing Step 100 g of the mixture of phosphor materials (BaFBr: Ca, Eu, precursor of phosphor) was loaded on a quartz boat, and thereafter, placed in a reactor core in which evacuation can be carried out (the volume of a firing region is 1.3 L). Immediately thereafter, exhaust of air was started and the degree of vacuum in the reactor core reached about 0.1 torr in 10 minutes. Subsequently, 1.5 ml of air (oxygen content is 0.3 ml) was introduced. Then, nitrogen gas was charged until the interior of the furnace was brought to substantially atmospheric pressure (760 torr) to obtain a weakly oxidizing atmosphere. The mixture of phosphor materials was fired at 830° C. (i.e., the temperature at the time of the firing $T_1$) for 2 hours within the electric furnace filled with the weakly oxidizing atmosphere.

Cooling Step(s)

After the firing, the weakly oxidizing atmosphere within the furnace was evacuated by a rotary pump. When the temperature at the time of the firing $T_1$ decreased to 600° C. (i.e., the first cooling starting point $T_2$), the weakly oxidizing atmosphere was replaced with a weakly oxidizing atmosphere, which is a first atmosphere, by introducing nitrogen gas containing a partial pressure of 4 torr of oxygen with respect to 756 torr of nitrogen gas. Thereafter, first cooling was carried out for 5 minutes at a cooling speed of 0.5° C./second. When the temperature dropped to 500° C. (i.e., the second cooling starting point $T_3$), exhaust of air (nitrogen gas) was started so that the first atmosphere was removed and the degree of vacuum in the furnace reached 0.1 torr. Further, second cooling was carried out at a cooling speed of 0.5° C./second until the interior of the furnace was brought into room temperature.

After completion of the cooling, the fired product was taken out from the furnace to obtain a calcium added europium-activated barium fluorobromide (BaFBr: 0.002 Ca, 0.005 Eu$^{2+}$) stimulable phosphor (3) having a tetradecahedral structure.

As a result of observing this stimulable phosphor (3) by means of a scanning electron microscope, it was confirmed that this stimulable phosphor has a tetradecahedral structure. Moreover, as a result of measuring the particle size of the phosphor by using the optical diffraction type particle size distribution measuring device, the average crystal size was 4.9 μm.

Example 3

A calcium added europium-activated barium fluorobromide (BaFBr: 0.002 Ca, 0.005 Eu$^{2+}$) stimulable phosphor (4) having a tetradecahedral structure was obtained in the same way as in Example 2 except that the cooling steps were carried out as in the following. In the cooling step, in place of the second cooling being carried out after the atmosphere within the furnace was brought into vacuum, evacuation was carried out when the temperature within the furnace dropped to 500° C. (the second cooling starting point $T_3$), and the first atmosphere was removed and then replaced with a nitrogen gas atmosphere. Further, the second cooling was carried out at a cooling speed of 1° C./second until the interior of the furnace was brought to room temperature.

As a result of observing this stimulable phosphor (4) by means of a scanning electron microscope, it was confirmed that this stimulable phosphor has a tetradecahedral structure. Moreover, as a result of measuring the particle size of the phosphor by using the optical diffraction type particle size distribution measuring device, the average crystal size was 4.9 μm.

Example 4

A calcium added europium-activated barium fluorobromide (BaFBr: 0.002 Ca, 0.005 $Eu^{2+}$) stimulable phosphor (5) having a tetradecahedral structure was obtained in the same way as in Example 2 except that the cooling step was carried out as in the following. After the firing, the weakly oxidizing atmosphere used in the furnace during the firing was evacuated by a rotary pump and the degree of vacuum in the furnace reached 0.1 torr. When the temperature within the furnace dropped to 600° C. (the first cooling starting point $T_2$), cooling was carried out at a cooling speed of 0.5° C./second until the interior of the furnace was brought to room temperature.

As a result of observing this stimulable phosphor (5) by means of a scanning electron microscope, it was confirmed that this stimulable phosphor has a tetradecahedral structure. Moreover, as a result of measuring the particle size of the phosphor by using the optical diffraction type particle size distribution measuring device, the average crystal size was 4.9 μm.

Example 5

A calcium added europium-activated barium fluorobromide (BaFBr: 0.002 Ca, 0.005 $Eu^{2+}$) stimulable phosphor (6) having a tetradecahedral structure was obtained in the same way as in Example 2 except that the cooling step was carried out as in the following. After the firing, the weakly oxidizing atmosphere in the furnace used during the firing was evacuated by a rotary pump. When the temperature at the time of the firing $T_1$ within the furnace dropped to 600° C. (the first cooling starting point $T_2$), nitrogen gas was introduced so that the atmosphere within the furnace was replaced with a neutral atmosphere. Subsequently, cooling was carried out at a cooling speed of 1° C./second until the interior of the furnace was brought to room temperature.

As a result of observing this stimulable phosphor (6) by means of a scanning electron microscope, it was confirmed that this stimulable phosphor has a tetradecahedral structure. Moreover, as a result of measuring the particle size of the phosphor by using the optical diffraction type particle size distribution measuring device, the average crystal size was 4.9 μm.

Comparative Example 2

A calcium added europium-activated barium fluorobromide (BaFBr: 0.002 Ca, 0.005 $Eu^{2+}$) stimulable phosphor (7) having a tetradecahedral structure was obtained in the same way as in Example 2 except that the cooling step was carried out as in the following. After the firing, the fired product was taken out to atmospheric air and allowed to stand for cooling until the temperature of the product dropped to room temperature. The cooling speed at the time of the cooling was 1° C./second.

As a result of observing this stimulable phosphor (7) by means of a scanning electron microscope, it was confirmed that this stimulable phosphor has a tetradecahedral structure. Moreover, as a result of measuring the particle size of the phosphor by using the optical diffraction type particle size distribution measuring device, the average crystal size was 4.9 μm. Measurement of Stimulated Emission Amount The stimulable phosphors (3) to (7) were each irradiated with 100 mR of an X-ray having tube voltage of 80 KVp, followed by excitation with an LD (whose wavelength is 660 nm) having an irradiation energy of 4.3 $J/m^2$. Subsequently, stimulated emission light radiated from the stimulable phosphor was received by a photomultiplier via a filter (B-410), and the stimulated emission amount was measured. The results are shown in Table 2 below. Evaluation of Erasability The stimulable phosphors (3) to (7) were each irradiated with 100 mR of an X-ray having tube voltage of 80 KVp, followed by scanning and excitation with an LD (whose wavelength is 660 nm) having an irradiation energy of 4.3 $J/m^2$. Subsequently, stimulated emission light radiated from the stimulable phosphor was received by a photomultiplier via a filter (B-410), and an initial stimulated emission amount was measured.

After the measurement of the initial stimulated emission amount, the phosphor was subjected to an erasure operation was carried out by irradiating onto the phosphor with light emitted from a fluorescent lamp equipped with a UV cutting filter at 500000 lux for 10 seconds. Thereafter, the phosphor was irradiated again with an X-ray and a laser in the same way as aforementioned, and the stimulated emission amount of the stimulable phosphor after erasure was measured.

Erasability is represented by the erasure value calculated in the same way as described above. As the numerical value becomes smaller, erasability improves. The calculation results are given in Table 2.

TABLE 2

| | Cooling step | | Cooling starting point | | Stimulated emission amount | Erasure value |
| | First atmosphere | Second atmosphere | $T_2$ [° C.] | $T_3$ [° C.] | | |
|---|---|---|---|---|---|---|
| Example 2 | Oxygen-containing nitrogen gas | Vacuum | 600 | 500 | 100 | $2 \times 10^{-5}$ |
| Example 3 | Oxygen-containing nitrogen gas | Nitrogen gas | 600 | 500 | 102 | $1.5 \times 10^{-5}$ |
| Example 4 | Vacuum (*1) | | 600 | — | 120 | $1 \times 10^{-4}$ |
| Example 5 | Nitrogen gas | | 600 | 500 | 115 | $8 \times 10^{-5}$ |
| Comparative Example 2 | Atmospheric air | | — | — | 10 | $5 \times 10^{-5}$ |

*1: Although the atmosphere at the time of the firing is removed, the atmosphere in the furnace is not replaced.

As is clear from Table 2, in Examples 2 to 5 of the preparing method of the present invention, in which the atmosphere at the time of the firing is removed after the firing and is replaced with an atmosphere different from the atmosphere at the time of the firing while the fired product is shut off from outside air, or the atmosphere at the time of the firing is removed and the firing and the cooling are carried out in vacuum while the interior of the furnace is shut off from outside air, a stimulable phosphor having a sufficient stimulated emission amount and further sufficient erasability was able to be prepared.

On the other hand, in comparative example 2 in which the cooling was carried out in atmospheric air after the firing, a stimulable phosphor having a sufficient stimulated emission amount and sufficient erasability was not able to be prepared.

A stimulable phosphor having a sufficient stimulated emission amount and sufficient erasability which allows for easier erasure was able to be stably prepared by the method of preparing a barium fluorohalide phosphor in accordance with the first, second and third aspects of the present invention.

What is claimed is:

1. A method of preparing a barium fluorohalide phosphor represented by the formula $(Ba_{1-a}, M^{II}_a) FX \cdot bM^I \cdot cM^{III} \cdot dA:xLn$, wherein $M^{II}_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Tl, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0 \leq a \leq 0.3$, $0 < b \leq 2$, $0 \leq c \leq 2$, $0 \leq d \leq 0.5$, and $0 < x \leq 0.2$, respectively, the method comprising the steps of:

(a) preparing a mixture of phosphor materials;
(b) firing the mixture of phosphor materials by the substeps:
  (i) burning the mixture of phosphor materials in an atmosphere at a substantially constant temperature; and
  (ii) removing the atmosphere and replacing with a different atmosphere while maintaining the substantially constant temperature; and
(c) annealing the mixture of phosphor materials.

2. The method according to claim 1, wherein the substantially constant temperature is from 500 to 1000° C.

3. The method according to claim 1, wherein the step of annealing is carried out while decreasing temperature at a rate of 0.2 to 5° C./minute.

4. The method according to claim 1, wherein a temperature difference between the substantially constant temperature and an atmosphere temperature of surrounding the mixture of phosphor materials after completion of the step of annealing is 50 to 300° C.

5. The method according to claim 1, wherein the step of annealing is conducted over a period from 30 to 180 minutes.

6. The method according to claim 1, wherein the step of removing the atmosphere and replacing is initiated during the substep of burning after the substep of burning is approximately 33 to 100% complete.

7. The method according to claim 1, wherein an atmosphere in the step of firing is a neutral to weakly reducing atmosphere, and an atmosphere in the step of annealing is an oxidizing atmosphere.

8. The method according claim 7, wherein the oxidizing atmosphere is weakly oxidizing and contains 0.1 to 200 ml of oxygen per 1 L of the atmosphere.

9. The method according claim 1, wherein the step of firing includes burning in a furnace having a firing region with a volume of 2 to 500 L per 1 kg of the mixture of phosphor materials, removing the atmosphere and introducing 0.1 to 200 ml of oxygen per 1 L of the volume of the firing region into the furnace, followed by introduction of an inert gas into the furnace to create an oxidizing atmosphere.

10. The method according to claim 1, wherein the substep of removing and replacing the atmosphere includes replacing the atmosphere so a degree of vacuum is no more than 1 torr.

11. A method of preparing a barium fluorohalide phosphor represented by the formula $(Ba_{1-a}, M^{II}_a) FX \cdot bM^I \cdot cM^{III} \cdot dA:xLn$, wherein $M^{II}_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Tl, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0 \leq a \leq 0.3$, $0 < b \leq 2$, $0 \leq c \leq 2$, $0 \leq d \leq 0.5$, and $0 < x \leq 0.2$, respectively, the method comprising the steps of:

(a) preparing a mixture of phosphor materials;
(b) firing the mixture of phosphor materials in a neutral to weakly reducing atmosphere;
(c) removing the neutral to weakly reducing atmosphere and introducing a first different atmosphere;
(d) cooling the mixture of phosphor materials;
(e) removing the first different atmosphere and introducing a second different atmosphere; and
(f) cooling the mixture of phosphor materials.

12. The method according to claim 11, wherein the first different atmosphere is a weakly oxidizing atmosphere, and the second atmosphere is a partial vacuum.

13. The method according to claim 11, wherein the first different atmosphere is a weakly oxidizing atmosphere, and the second atmosphere is a neutral gas atmosphere.

14. The method according to claim 11, wherein the partial vacuum is of a degree of no more than 1 torr.

15. The method according to claim 13, wherein the neutral gas atmosphere is an inert gas atmosphere selected from the group of gases consisting of $N_2$, Ar, He, and any combination thereof.

16. The method according claim 12, wherein the first different atmosphere is substantially nitrogen having 0.0001 to 10 ml of oxygen per 1 L of the first different atmosphere.

17. The method according to claim 11, wherein the step of removing and replacing the neutral to weakly reducing atmosphere is conducted while performing cooling until the temperature decreases at least 30° C., and then introducing the first different atmosphere, the first different atmosphere being at a substantially constant temperature, said substantially constant temperature being from 300 to 700° C.

18. The method according claim 11, wherein in the step of firing, firing is performed at a substantially constant temperature from 500 to 1000° C.

19. The method according to claim 11, wherein the step of firing includes the substep of annealing.

20. The method according to claim 11, wherein in the step of removing and replacing the neutral to weakly reducing atmosphere, removing is performed while cooling is conducted.

21. A method of preparing a barium fluorohalide phosphor represented by the formula $(Ba_{1-a}, M^{II}_a) FX \cdot bM^I \cdot cM^{III} \cdot dA:xLn$, wherein $M^{II}_a$ is at least one alkaline earth metal selected from the group consisting of Sr, Ca and Mg; $M^I$ is an alkali metal compound comprising at least one metal selected from the group consisting of Li, Na, K, Rb and Cs; $M^{III}$ is a trivalent metal compound comprising at least one metal selected from the group consisting of Al, Ga, In, Tl, Sc, Y, Cd and Lu, except for $Al_2O_3$; X is at least one halogen selected from the group consisting of Cl, Br and I; Ln is at least one rare earth element selected from the group consisting of Ce, Pr, Sm, Eu, Gd, Tb, Dy, Ho, Nd, Er, Tm and Yb; A is at least one metal oxide selected from the group consisting of $Al_2O_3$, $SiO_2$ and $ZrO_2$; and a, b, c, d and x are $0a \leq 0.3$, $0 < b \leq 2$, $0 \leq c \leq 2$, $0 \leq d \leq 0.5$, and $0 < x \leq 0.2$, respectively, the method comprising the steps of:

(a) preparing a mixture of phosphor materials;

(b) firing the mixture of phosphor materials in a neutral to weakly reducing atmosphere;

(c) removing the neutral to weakly reducing atmosphere and replacing with a partial vacuum, and if not a partial vacuum, then a neutral gas atmosphere; and (d) cooling the mixture of phosphor materials.

22. The method according claim 21, wherein the partial vacuum is of a degree of no more than 1 torr.

23. The method according to claim 21, wherein the neutral gas atmosphere is an inert gas atmosphere selected from the group of gases consisting of $N_2$, Ar, He, and any combination thereof.

* * * * *